US008200522B2

(12) United States Patent
Bruce et al.

(10) Patent No.: US 8,200,522 B2
(45) Date of Patent: Jun. 12, 2012

(54) REPEATABLE AND STANDARDIZED APPROACH FOR DEPLOYMENT OF A PORTABLE SOA INFRASTRUCTURE WITHIN A CLIENT ENVIRONMENT

(75) Inventors: Edwin J. Bruce, Corinth, TX (US); Alan D. Emery, North Richland Hills, TX (US); Romelia H. Flores, Keller, TX (US)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 11/925,318

(22) Filed: Oct. 26, 2007

(65) Prior Publication Data

US 2009/0112646 A1 Apr. 30, 2009

(51) Int. Cl.
G06Q 10/00 (2012.01)
G06F 9/44 (2006.01)

(52) U.S. Cl. ...... 705/7.25; 705/7.27; 705/301; 717/101; 717/120

(58) Field of Classification Search .................. None
See application file for complete search history.

(56) References Cited

U.S. PATENT DOCUMENTS

| | | | |
|---|---|---|---|
| 6,854,107 B2 | 2/2005 | Green et al. | |
| 7,158,940 B2 | 1/2007 | Cimral et al. | |
| 2002/0054086 A1 | 5/2002 | Van Oostenbrugge et al. | |
| 2002/0169852 A1 | 11/2002 | Schaeck | |
| 2003/0014560 A1 | 1/2003 | Mugica et al. | |
| 2003/0107596 A1 | 6/2003 | Jameson | |
| 2004/0001565 A1 | 1/2004 | Jones et al. | |
| 2004/0090969 A1 | 5/2004 | Jerrard-Dunne et al. | |
| 2004/0093381 A1 | 5/2004 | Hodges et al. | |
| 2004/0183831 A1 | 9/2004 | Ritchy et al. | |
| 2004/0226955 A1 | 11/2004 | Ly | |
| 2004/0249664 A1 | 12/2004 | Broverman et al. | |
| 2004/0261053 A1* | 12/2004 | Dougherty et al. | 717/101 |
| 2005/0114829 A1* | 5/2005 | Robin et al. | 717/101 |
| 2005/0125772 A1 | 6/2005 | Kohno | |
| 2005/0154701 A1 | 7/2005 | Parunak et al. | |
| 2005/0267789 A1 | 12/2005 | Satyadas et al. | |
| 2006/0184883 A1 | 8/2006 | Jerrard-Dunne et al. | |
| 2006/0235733 A1* | 10/2006 | Marks | 705/7 |
| 2007/0011126 A1 | 1/2007 | Conner et al. | |
| 2007/0130561 A1 | 6/2007 | Siddaramappa et al. | |
| 2007/0169016 A1 | 7/2007 | Aakolk et al. | |

(Continued)

OTHER PUBLICATIONS

Zdun "Model-Driven and Pattern Based Integration of Process-Driven SOA Models" (2006) Dagstuhl Seminar Proceedings. The Role of Business Processes in Service Oriented Architectures.*

(Continued)

*Primary Examiner* — Lynda Jasmin
*Assistant Examiner* — Sujay Koneru
(74) *Attorney, Agent, or Firm* — Patents on Demand P.A.; Brian K. Buchheit; Scott M. Garrett

(57) ABSTRACT

The present invention discloses a repeatable and standardized approach for deploying a SOA infrastructure to client environments. The approach is designed to accelerate a deployment by leveraging existing integration assets and utilizing a phased approach when executing the deployment. It is preferred to perform the integration with significant client participation, which speeds the deployment process while ensuring knowledge of a resulting SOA solution is transferred to a client's IT team. Stages of the phased approach can include a transition enablement stage, an environment preparation stage, a sandbox delivery stage, and an integration and skills transfer stage.

15 Claims, 10 Drawing Sheets

U.S. PATENT DOCUMENTS

2007/0198312 A1  8/2007  Bagchi et al.
2007/0203766 A1  8/2007  Adler et al.

OTHER PUBLICATIONS

Tran et al. "View-based Integration of Process-driven SOA Models at Various Abstraction Levels" (2006).*

Chen, I.Y., et al., "An SOA-based software deployment management system," 2006 IEEE/WIC/ACM Int'l Conf. on Web Intelligence, 2006.

Suri, J., et al., "Building Mashup Portlets," Sun Microsystems, Aug. 24, 2006.

"A Primer on Enterprise Mashups: Productivity Drivers for the Web 2.0 Application Style," Kapow Technologies, 2007.

"Interface for Creating Custom, End-User, Role Based Application Interface", Disclosure No. IPCOM13828D, IBM Corporation, Oct. 2000.

"SOA Workplace Portal: Emissions Dashboard", IBM Corp., Nov. 11, 2006.

* cited by examiner

SOA Infrastructure Deployment Skills Prerequisites 400

| |
|---|
| Security – LDAP, Tivoli |
| The creation of users and security infrastructure specific to the client's environment. |
| Application Development – Rational Application Developer |
| Java development, debugging and deployment of code. |
| XML schema design and deployment. |
| Familiarity with web services standards from w3c (i.e. SOAP) |
| Data Management – DB2 |
| Creation of databases, tables, and schema for temporary and durable persistence. |
| User Experience – WebSphere Portal |
| The creation of portlets and portal techniques such as inter-portlet communication. |
| Messaging Middleware – WebSphere MQ and WebSphere Message Broker |
| Knowledge of the creation of message queues, message flows and the user of publish/subscribe configurations. |

Skills Acquired from the SOA Infrastructure Deployment Process 420

| |
|---|
| SOA Design – Use Case Definition and Interaction Flows |
| Experience in documenting business use cases and interaction flows. |
| Application Development – Rational Application Developer |
| Experience with Web Services facilities within the RAD environment. |
| Java Bean development to enable client access. |
| User Experience – WebSphere Portal |
| Experience with BowStreet Dashboard Package dial and graph rendering techniques. |
| Experience with the use of client Java Bean libraries supporting Web Services integration. |
| Experience in implementing data handlers to enable performance enhancements with the portal environment. |
| Experience in enhancing portlet refresh via AJAX techniques and JSPs. |
| Messaging Middleware – WebSphere MQ and WebSphere Message Broker |
| Experience in the creation of queuing infrastructure and associated message flows. |
| Experience with business process modeling and implementation. |
| Experience with database access from Message Broker. |
| Experience with XML message transformation. |
| SOA Infrastructure – Service Domains & Providers |
| Experience in defining Service Domains. |
| Experience in defining Service Providers. |
| Experience in creating interface definitions utilizing SML and data formatting approaches. |

FIG. 4

| Reference Platform 510 | Available Target Platforms 520 | Preferred Target Platform 530 |
|---|---|---|
| This section lists details for a given component in the solution<br>Hardware details listed here reflect what the specific component is currently deployed on in the GSC lab, this is not necessarily the minimum hardware requirement needed for the component to function as desired<br>This section uses the following format:<br><br>Component (*name*):<br>Operating System<br>*Installed Software*<br>hardware platform<br>disk space<br>memory size | Use this column to list all hardware/software environments that should be considered for this component in the client's target infrastructure using the same layout as column one:<br><br>Component (*name*):<br>Operating System<br>*Installed Software*<br>hardware platform<br>disk space<br>memory size | License:<br>\_\_OS<br>\_\_MW<br>\_\_DB<br>\_\_PORTAL<br>\_\_APPL<br><br>A space is provided check off that licensing is available for each piece of software required "\_X\_" (operating system, database management, middleware, etc.) It is the client's responsibility to obtain each license prior to start of component installation.<br>In the space available below the license section, please list the preferred target platform's hardware/software details (following the format used in the preceding columns).<br><br>Component (*name*):<br>Operating System<br>*Installed Software*<br>hardware platform<br>disk space<br>memory size |

| Gaps, Findings and Notes 540 | Agreed Upon Target Platform License : 550 |
|---|---|
| This section documents significant gaps, findings related to those gaps, and any notes that need to be maintained regarding the final selection of the component's target platform. - initials | \_\_OS<br>\_\_MW<br>\_\_DB<br>\_\_PORTAL<br>\_\_APPL<br><br>Component *(name):*<br>Operating System<br>Installed Software<br>   hardware platform<br>   disk space<br>   memory size |

FIG. 5

| Reference Platform 610 | Available Target Platforms 620 | Preferred Target Platform 630 |
|---|---|---|
| Red Hat Enterprise Linux AS release 4, Update 4 | Red Hat Enterprise Linux AS release 4, Update 1 | Red Hat Enterprise Linux AS release 4, Update 1 |
| *WebSphere Application Server 6.0.2.17* | WebSphere Application Server 6.0.2.17 | WebSphere Application Server 6.0.2.17 |
| IBM eServer pSeries 7044-270 2x18GB HDD (22GB used) *4GB RAM* | VM on z9 system 30GB HDD 4GB RAM | VM on z9 system 4GB RAM 32GB HDD    8GB / file system    24GB /opt file system |

| Gaps, Findings and Notes 640 | Agreed Upon Target Platform 650 |
|---|---|
| Not going to WAS 6.1 due to relative fix immaturity (6.1.0.7 current); 6.0.2.17 known and proven. | SUSE Linux Enterprise Server 9, patch level 3 |
| Default HDD allocation 6GB (/), remainder to LV (/opt); can change if needed, but deemed OK for now. | WebSphere Application Server 6.0.2.19 |
| Host name confirmed as 'z9appsvr'; IP address 172.16.80.42 assigned by John Smith. | VM on z9 system 2GB RAM 8GB / 32GB /opt |
| Move to SLES 9 due to interim Red Hat image stability issues; committing to SLES going forward. | |
| Latest WAS 6.0.2 Fix Pack available, so adopted. | |

FIG. 6

SOA Workplace JumpStart Skills Transfer (Day 1)     810
- Introductions & JumpStart Objectives
- SOA Workplace Overview
  - Project Summary
  - Solution Goals & Success Criteria
- SOA Workplace Design Methodology
  - SOA & Web Services Basics
  - Domain Identification
  - Business Scenario
  - Architecture & Methodology
  - Use Case Definition
  - Interaction Diagrams
  - Component Implementation
- SOA Workplace Demonstration
  - System Checkout Procedure
  - Demo Script

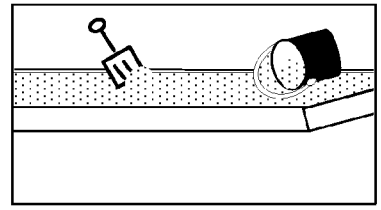

SOA Workplace JumpStart Skills Transfer (Day 1)     812
- Development Environment
  - RAD Prototype Development
  - Code Structure and Naming Convention
  - Version Control and Problem Tracking
  - Other Development and Testing Tools
- SOA Workplace User Experience Methodology
  - HTML Portal Mockup
  - Graph and Rendering Techniques
  - User Experience Theory & Design
  - Portal Implementation Overview
  - Problem Determination Tips
- SOA Workplace Clients
  - Client Setup / Configuration
    - Basic System Requirements
    - Administrative Functions
    - Demonstration Functions

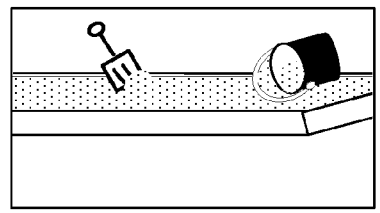

FIG. 8A

SOA Workplace JumpStart Skills Transfer (Day 3)  830
- Day 2 Review
- Service Providers
  - Implementation, Deployment and Configuration
    - Identify the Service Domains
    - Define Data Elements
    - Define Interactions
    - Generate XML Schemas
    - Generate the SDO Model
    - Generate Service Endpoints and Proxies
  - Problem Determination Tips

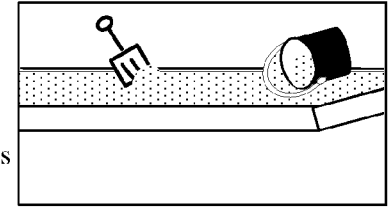

SOA Workplace JumpStart Skills Transfer (Day 3)  832
- SOA Workplace Messaging Middleware
  - ESB Subcomponents
  - Messaging Middleware Implementation
    - Modeling
    - Routing
    - Transformation
    - Lightweight business processing
    - Caching
  - Push/Pull Design Overview
  - Queue Infrastructure and Associated Message Flows
  - Problem Determination Tips
- JumpStart Skills Transfer Summary

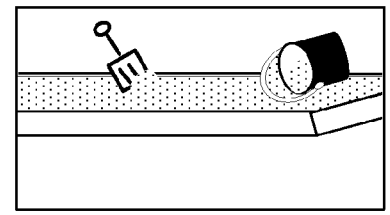

FIG. 8C

REPEATABLE AND STANDARDIZED APPROACH FOR DEPLOYMENT OF A PORTABLE SOA INFRASTRUCTURE WITHIN A CLIENT ENVIRONMENT

BACKGROUND

1. Field of the Invention

The present invention relates to the field of SOA architecture deployment technologies and, more particularly, to a repeatable and standardized approach for deploying a portable SOA infrastructure within a client environment, which leverages existing integration assets and that transfers skills relating to the deployed SOA solution to a client's IT team.

2. Description of the Related Art

A Service Oriented Architecture (SOA) is an information technology infrastructure which abstracts business services and separates them from applications to yield an overall system that is easier to build, maintain, and extend than traditional systems. That is, services in a SOA serve as an abstraction layer that hides core system implementation from clients and provides a simple loosely coupled way to integrate both service consumer and provider. The coupling is based upon simple XML based messages and open standards that describe the protocol for service discovery and invocation (e.g., WSDL, SOAP, UDDI). In a SOA infrastructure, the infrastructure components that determine the communication system do not affect the interfaces. Each interaction is independent of each and every other interaction and the interconnect protocols of the communicating devices.

Critics of an SOA approach have argued, with some validity, that SOA often focuses on application design and construction and is only secondarily concerned with distribution. That is, SOA platforms permit developers to turn any set of programming language objects directly into a set of distributed services regardless of the objects suitability for distribution. In other words, many existing SOA platform and implementation approaches focus too heavily upon a programming-language level during early development stages and not heavily enough at the distribution level, ignoring long standing lessons that adding distribution elements after the fact to developed software simply does not yield positive results.

To illustrate the problem, consider that each SOA component can define its own input/output parameters, configuration options, performance characteristics, and the like. Many existing SOA components are effectively "SOAP wrapped" legacy components, which have been repurposed for a SOA architecture. Although there is nothing inherently wrong with this practice, which can be highly advantageous in many situations, connecting or interfacing various SOA components can be extremely challenging, time consuming, and costly. Further, SOA components generally must be deployed to a client software/hardware infrastructure at some point, which can depend upon design characteristics of individual SOA components.

In other words, the flexibility of a SOA architecture can be a disadvantage in that solutions can be patched together easily that contain many ill fitting components, which results in maintenance and upgrading problems, poor performance, and other issues. Many negative connotations have been attributed to SOA architectures that are less inherent problems of an SOA approach and more problems relating to poor SOA deployment choices and lack of knowledge concerning a valid deployment environment. For example, a client receiving a SOA solution may not fully understand the solution being purchased, its limitations, and its expected maintenance and upgrade costs. A SOA deployment team similarly may not understand a client's environment and solution goals, which can result in less than ideal choices for the client being made, as the SOA solution is selected/constructed/deployed.

One solution to minimize many potential problems with integrating SOA components is to establish a reference SOA solution consisting of numerous "plug-and-play" software SOA components. For example, U.S. patent application Ser. No. 11/232,159 filed Sep. 21, 2005 and entitled "Service-Oriented Architecture for Enterprises That Supports Multiple Interface Channels", discloses a SOA infrastructure framework shown in FIG. 1 (Prior Art). Other SOA architectures can be used as a reference SOA solution, and the one shown in FIG. 1 is not intended to limit the scope of a reference model. The FIG. 1 provides different clients 110 with presentation services 120 and application services 122 through a service gateway 126. A set of resources 130 can be connected to the service gateway 126 via a service bus 132. An integration service provider 134 can integrate the back-end resources 130 and can provide a consistent interface with the service gateway 126.

While reference SOA solutions can help alleviate many potential problems, many deployment specific issues still arise. FIG. 2 (Prior Art) depicts a software component model 200 (target model), which is a deployed instance of the SOA framework (reference model) shown in FIG. 1. A typical approach to deploying the target model 200 can involve:

(1) Taking into account software components (products) already purchased, corporate standards, industry standards, and/or end user preferences and identifying one or more candidate components for performance of each function within the SOA framework (of FIG. 1).
(2) Installing/configuring the software components.
(3) Implementing techniques to orchestrate the SOA framework, such that the software components effectively work together.
(4) Testing the resulting implementation.

At present, it is common to begin implementation of the software component model by going through the above steps as if constructing the model was a unique endeavor. That is, every implementation instance is approached as unique. Deployments are dependent upon experience levels and preferences of an asset deployment team and are generally performed in manner lacking uniformity among different deployments and teams, and lessons learned and best practices are not institutionalized into a systematic, repeatable process. Clients are often minimally involved in the SOA solution deployment process, which results in poor client understanding of a resulting SOA solution. A client's IT team, as a result of imperfect understanding of the implemented SOA solution, has difficulty maintaining the SOA solution and enhancing the system for future application functional requirements.

What is needed is a systematic approach to deploy a "portable" SOA infrastructure (reference model) into a client environment (creating a target model), which leverages integration assets from past deployments. Ideally, the deployment of this SOA based solution can include a knowledge transfer of implementation specifics to a client's development team. An optimal deployment approach would be standardized and repeatable, which would minimize risks taken by a deployment team (integration assets owner) in meeting their client's needs and contracted deadlines, which would in turn minimize client risks in adopting a SOA solution.

SUMMARY OF THE INVENTION

The present invention discloses a repeatable and standardized approach for deploying a SOA infrastructure to client environments. The approach is designed to accelerate a deployment by leveraging existing integration assets and utilizing a phased approach when executing the deployment. It is preferred to perform the integration with significant client participation, which speeds the deployment process while ensuring knowledge of a resulting SOA solution is transferred to a client's IT team. Stages of the phased approach can include a transition enablement stage, an environment preparation stage, a "sandbox" delivery stage, and a integration and skills transfer stage. The overall phased approach can occur over a relatively short period, such as over a two-and-a-half-month time from beginning to end (based on a transition enablement phase of two and one half weeks; an environment preparation phase of one month; a sandbox delivery phase of two and one half weeks; and an integration and skills transfer stage of one week).

In the disclosed approach, during the transition enablement phase, a formal "gap analysis" can be performed between a reference software component model and a target software component model for the client's environment and needs. In the environment preparation stage, customizations needed to reconcile differences between the reference model and the target model can be constructed by an integration asset owner. Additionally, environmental components needed within the target model can be set up by the client IT team. In the sandbox delivery stage, all integration customizations can be fully implemented and packaged with the integration assets, which are ultimately delivered to the client implementation once a full environment to be deployed has been validated with testing. In the integration and skills transfers stage, exercises can be conducted between the integration staff and the client IT team to ensure the client IT team has hands-on experience with the deployed solution and fully understands the deployed SOA framework and integration assets.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

The FIG. 1 (Prior Art) shows a sample portable SOA framework, which can be used as a reference model.

FIG. 4 is an example enumerating a set of prerequisite skills that client IT team members should have before a deployment of a SOA solution and a set of skills acquired from the deployment process in accordance with an embodiment of the inventive arrangements disclosed herein.

FIG. 5 is an example of a blank gap analysis document that can be completed during a transition enablement stage of the SOA deployment approach.

FIG. 6 is an example of a finalized version of a gap analysis document that is delivered to a client.

FIG. 8A-C illustrate a series of agendas for skills transfer sessions for the integration and skills transfer stage of the deployment approach disclosed herein.

DETAILED DESCRIPTION OF THE INVENTION

Figure 1:
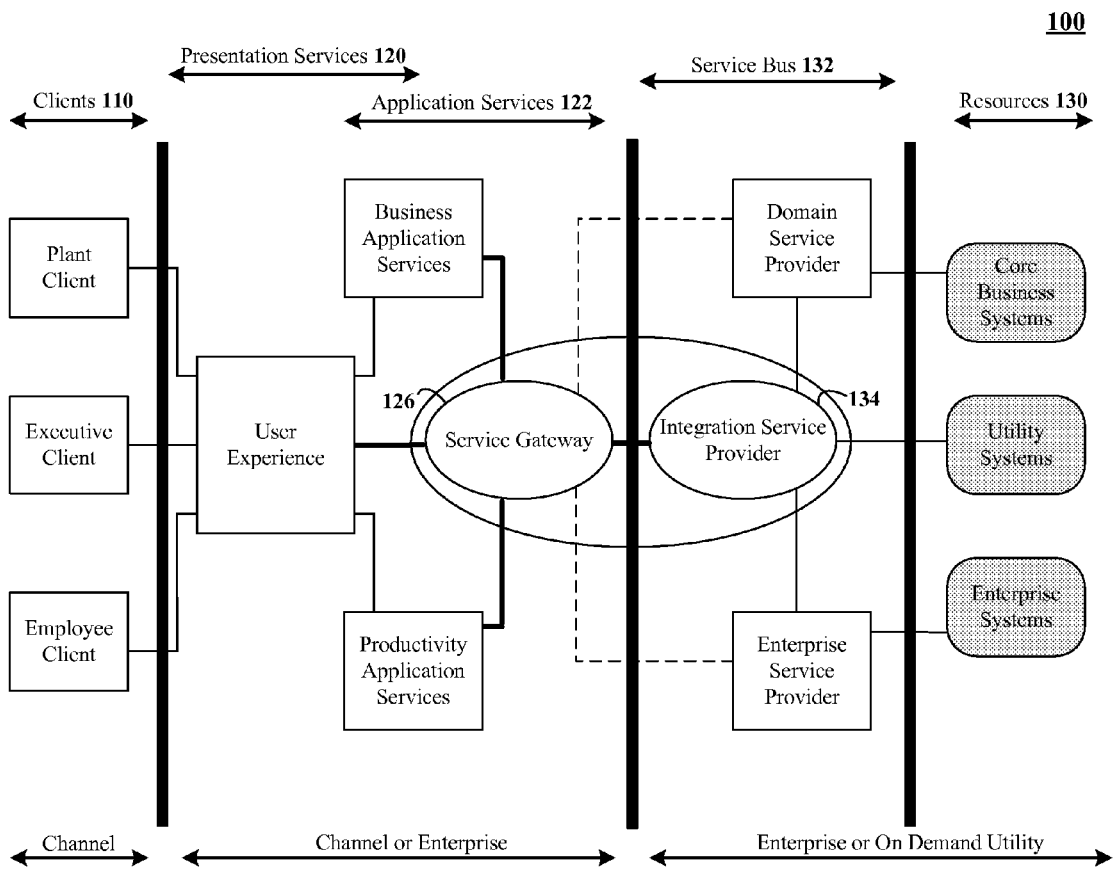
Figure 2:
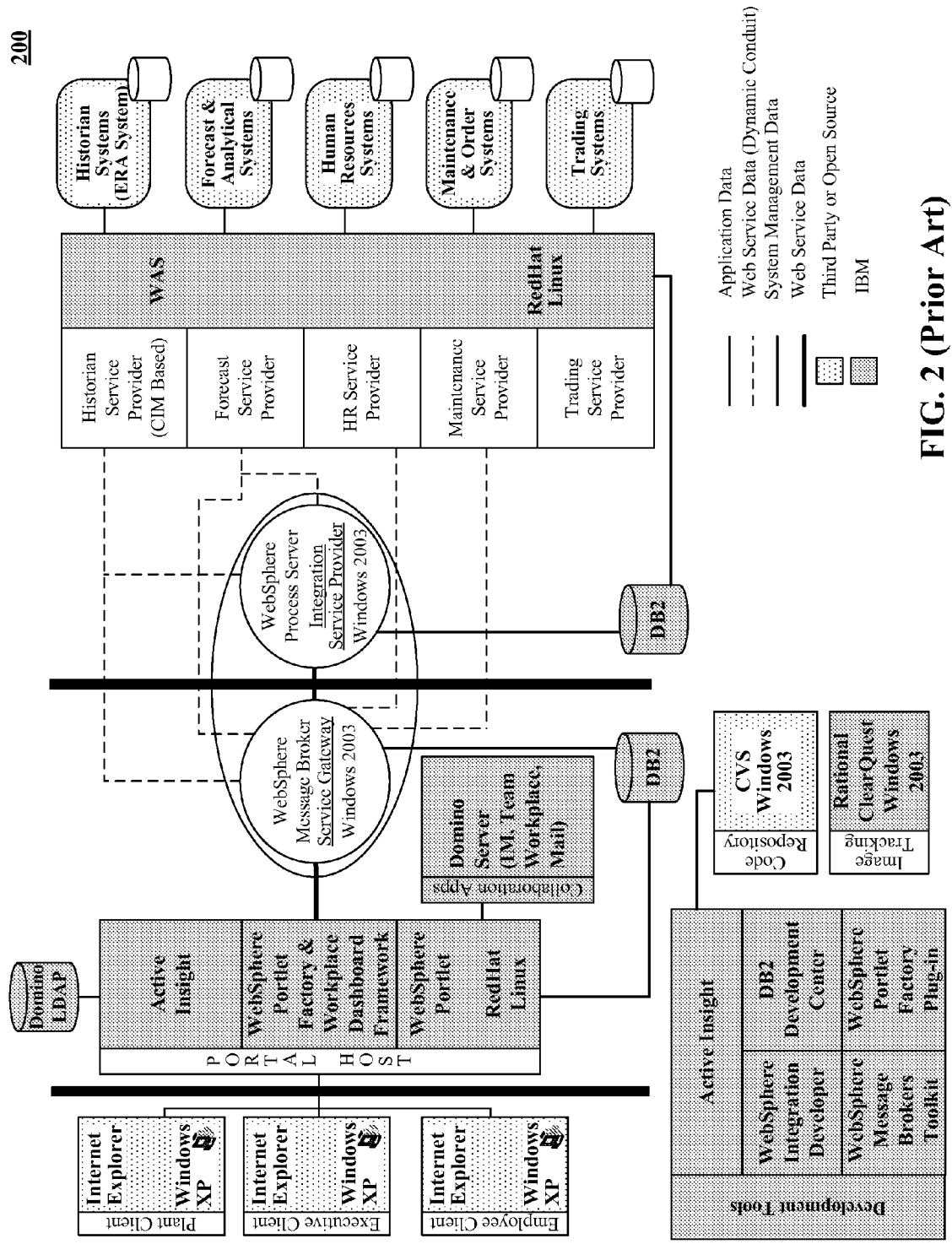
FIG. 2 (Prior Art) depicts a target model, which is a deployed instance of the SOA framework (reference model) shown in FIG. 1.
Figure 3:
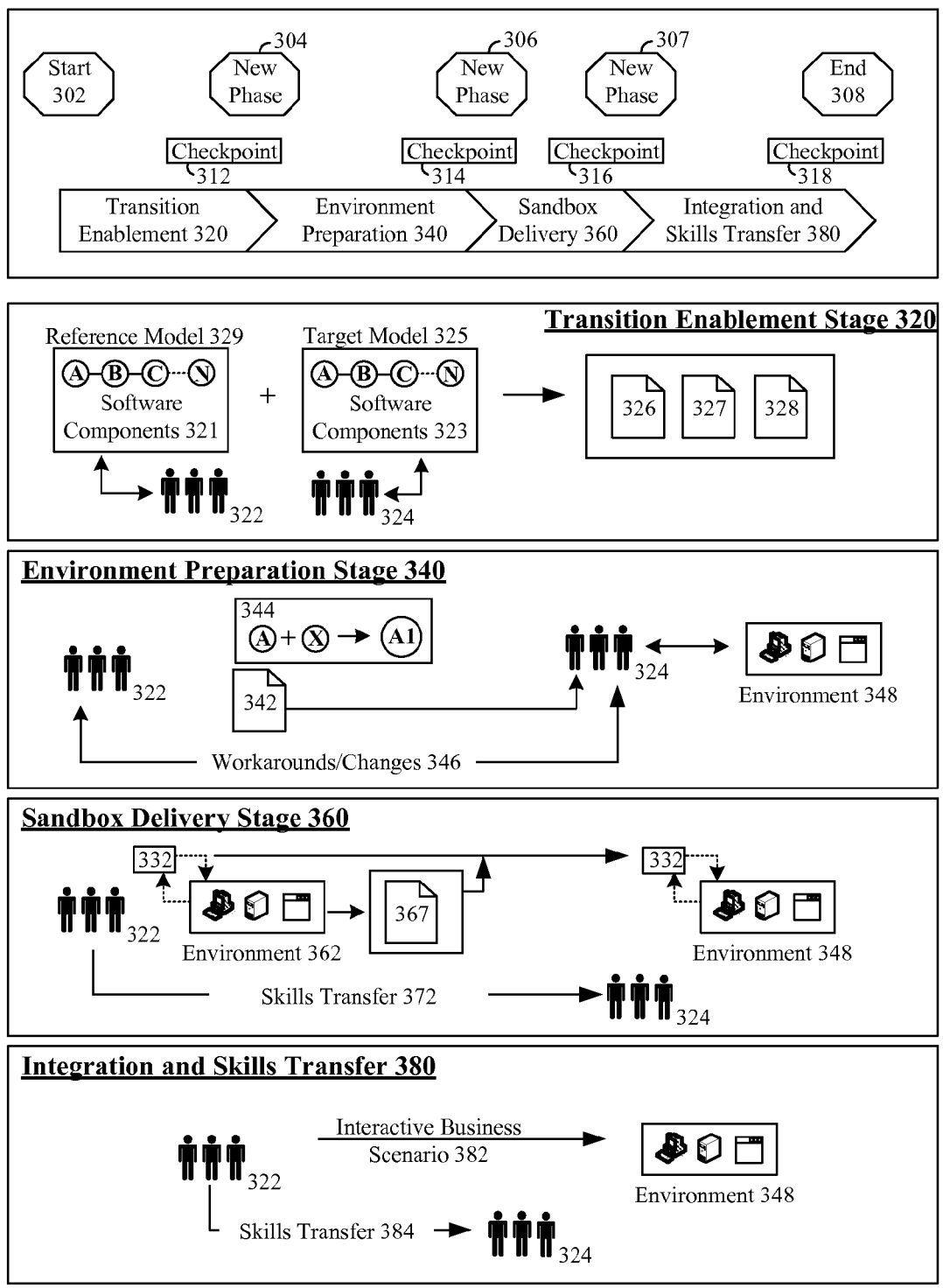
FIG. 3 is a schematic diagram showing an approach for deploying a portable Service Oriented Architecture (SOA) infrastructure in accordance with an embodiment of the inventive arrangements disclosed herein.

FIG. 3 is a schematic diagram showing an approach 300 for deploying a portable Service Oriented Architecture (SOA) infrastructure in accordance with an embodiment of the inventive arrangements disclosed herein. The approach 300 is a phased one having a transition enablement stage 320, an environment preparation stage 340, a sandbox delivery stage 360, and an integration and skills transfer stage 380. Each of the stages has a defined starting/ending point 302-308 and a defined checkpoint 312-318 at the end of each stage for evaluating/ensuring that each stage was successfully implemented. When a checkpoint 312-318 produces less than ideal results, corrective actions can be taken to ensure defined conditions are met before the approach 300 progresses to a next phase. Unlike conventional approaches, the approach 300 represents a repeatable, standardized methodology designed to leverage existing integration assets during a deployment.

The approach 300 can be implemented in a context in which a portable SOA infrastructure referred to as a reference model is being customized for and deployed within a production computing environment, referred to as a target model. The reference model can be "owned" by an integration asset owner, which dedicates a deployment team to perform actions on its behalf throughout the stages 320, 340, 360, and 380. The target model can be used by a client, which uses their own information technology (IT) team to maintain and improve a deployed SOA solution. Initially, the deployment team can include experts on SOA technologies having specific expertise on components included in the reference model. The client IT team can initially possess some basic skills relating to SOA technologies and can include experts regarding specifics of existing client infrastructure assets and client goals for the target model.

During the transition enablement stage 320 an asset owner (e.g., owner of a reference model) can allocate resources and dedicate a deployment team 322 to implement a SOA solution based on a reference model 329 for a client. A deployed SOA solution implemented in the client's environment can be referred to as target model 325. A client can designate a client IT team 324 to interact with the deployment team 322 early in the process. A set of prerequisites can exist for members of the client team 324, such as basic proficiencies and understandings of core SOA concepts to ensure that knowledge can be effectively transferred between the teams 322, 324.

Initially, the teams 322, 324 can interact to determine requirements 326, such as appropriate hardware, software, and floor space exist for a proposed deployment. In order to fully understand the requirements 326 and their significance during the deployment process, a "gap analysis" between the reference model 329 and the target model 325 can be performed, which results in a "gap report" 327. The gap report 327 can identify areas of differences between the models 329, 325, where an overall intent during stage 320 is to utilize as many components 321 from the reference model 329 as possible when generating the target model 325 so that development and integration time, cost, and uncertainty attributable to new components 323 are minimized. The deployment team 322 and client IT team 324 can negotiate differences and component 323 exceptions so that ultimately both teams 322, 324 are in agreement. At this point, a resolution report 328 can be established, which specifies a list of resolved hardware/software requirements for the client's environment needed for the target model 325. The software requirements of report 328 can indicate any license issues for implementing the target model 325. The resolution report 328 can serve as a baseline constraint, which the deployment team 322 must consider during the deployment process.

Once the gap analysis is complete, and reports 327 and 328 are generated, the client can begin to acquire appropriate hardware, software, and resources to create an infrastructure able to support the agreed upon target model 325. The client can also establish a backup strategy to enable clean restorations of the target model 325 within their computing environment at this stage 320. A checkpoint 312 for stage 320 can be an agreement upon details for the reports 327, 328 between the teams 322, 324, which permits progress to the environment preparation stage 340.

In the environment preparation stage 340, the deployment team 322 can define component customization requirements 344 for code to resolve issues established by the resolution report 328. To ensure a high degree of success in the customization effort, it can be important that requirements 344 are established by technology experts who understand the reference model 329, integration assets, and exact changes required for the software components 321 as specified in report 328.

As the requirements 344 are produced, the team 322 can create setup documents 342 for the target model 325 to be deployed in the target environment 348. Using setup documents 342 the client IT team 324 can perform setup actions necessary for preparing target environment 348 to support the target model 325. For example, the setup documents 342 can specify appropriate code versions for the target environment 348. Because many early version of the target model 325 complete with customizations satisfying requirements 344 may be thoroughly tested by team 322 in a test environment (stage 360) before deployment in the target environment 348, compatibilities of the target environment 348 and test environment 362 can be important.

Stage 340 can have some dynamic characteristics, which require open channels of communication to be maintained between the teams 322, 324. For example, when either team 322, 324 experiences problems with their tasks, workarounds or changes 346 often involving adjustments by the other team 322, 324 can occur. For instance, deployment team 322 can make an adjustment to the customizations in the requirements 344 to minimize resource consumption of environment 348 should the requirements of document 342 be overly problematic for team 324 and/or to minimize the volume of costly software licenses required for the target environment 348. Similarly, an initial customization requirement 344 may prove to be problematic, which will cause an alternative approach to be taken, with a corresponding adjustment in the target environment 348, which can be negotiated between the teams 322, 324. Once firm, detailed requirements 344 and setup documents 342 are established and suitable adjustments to the target environment 348 are made, checkpoint 314 can be satisfied and the approach 300 can progress to the sandbox delivery stage 360.

In the sandbox delivery stage 360, a deployment team 322 can fully implement all the customizations required for the target environment 348 and can test the resulting target model 325 in a sandbox test environment 362, which mirrors the target environment 348. Use of the sandbox test environment 362 ensures that the newly created customizations are fully tested prior to reaching a target environment 348. During this process of ensuring functionality within the sandbox test environment 362, the deployment team 322 can package 367 integration assets, customizations, and software components 321 for deployment within the target environment 348.

Once all environment 362 testing is complete, the deployment 322 can deliver all appropriate integration code packages 367 excluding those that require licenses handled by the client IT team 324. Team 322 can then run initial tests on the environment 348 to verify that is properly configured to support the target model 325. Then the model 325 can be implemented in the target environment 348 and validation and verification operations can be conducted to ensure (i.e., checkpoint 316) that transfer to the target environment 348 was successful. During this stage the team 322 will interact with team 324 members, thereby transferring skills 372 needed to ultimately permit team 324 to support the target model 325 with minimal outside assistance.

In the integration and skills transfer stage 380, the deployment team 322 can test a full business scenario 382 against the delivered target model 325. The business scenario 382 testing can be a highly interactive process involving the client IT team 324, which facilitates a skills transfer 384. Skills transfer 384 activities can include lab exercises and hands-on training designed to enable a greater understanding of the SOA framework of the model 325 and its integration assets as deployed in environment 348. Skills transfer 384 activities can focus on all aspects of the target model 325 including those for application development, messaging middleware and orchestration of the SOA infrastructure, maintenance and operation activities, upgrade and enhancement considerations, and the like. In one embodiment, tests can be administered by the development team 322 for team 324 members to ensure necessary skills 384 have been acquired. Successful completion of these tests and/or completion of all contracted activities (which may not include skills testing) can represent checkpoint 318, which signifies a completion of stage 380 and of the deployment of approach 300.

FIG. 4 is an example enumerating a set 400 of prerequisite skills that client IT team members should have before a deployment of a SOA solution and a set 420 of skills acquired from the deployment process in accordance with an embodiment of the inventive arrangements disclosed herein. The deployment can be conducted using the approach 300. The sets 400, 420 include information specific to a sample deployment. Different deployments will, of course, have their own specific sets of prerequisite requirements and their own set of acquired skills, which can differ significantly from those shown in FIG. 4.

As shown, the set 400 of prerequisite skills include security, application development, data management, user experience, and messaging middleware specific skills. The set 420 of acquired skills relate to SOA design, application development, user experience, messaging middleware, and SOA infrastructure. The sets 400, 420 of skills can span one or more different individuals included within a client IT team. Different ones of these team members can possess/acquire any subset of the skills 420 and prerequisites 400 shown. A level of redundancy of skills and/or prerequisites can be advantageous to minimize availability based delays during deployment and to minimize a risk of critical skill loss through IT employee attrition.

FIG. 5 is an example of a portion of a blank gap analysis document 500 that needs to be completed during a transition enablement stage 320 of the SOA deployment approach 300. The document 500 can be intended to help a client understand their SOA environmental requirements and to help a deployment team to understand customizations required when modifying a reference model to create a target model, which is able to be deployed in a client's computing environment.

Document 500 includes columns for a reference platform 510, a set of available target platforms 520, and a preferred target platform 530. The reference platform 510 can list software components by type for a reference model. The second column 520 can be completed from client input and can indicate a set of available platforms and resources in the client's computing environment that can be considered for installation of software components contained in the reference model 510. The preferred target platform column 530, which can also be completed based upon client provided input, can reflect a preferred platform for installing one or more of the components of the reference model. The preferred platform 530 can be selected from a set of candidate platforms based upon a match against the platform's capabilities and the hardware/software requirements of the software component to be installed. Gaps, findings and notes can be added to section 540. Details expressed in section 550 can indicate a target platform, upon which the software component(s) will be installed. A client can negotiate to modify the original platform of section 530 in numerous ways before deployment, which accounts for differences between section 530 and section 550, which are also reflected in section 540. A test environment used in the sandbox delivery stage 360 before deployment to a client environment can be based on section 550 specifics.

FIG. 6 is an example of a finalized version of a portion of a gap analysis document 600 that is delivered to a client. That is, document 600 represents a completed version of document 500 expressed above. So section 610 corresponds to section 510, section 620 to section 520, section 630 to section 530, section 640 to section 540, and section 650 to section 550.

Figure 7:
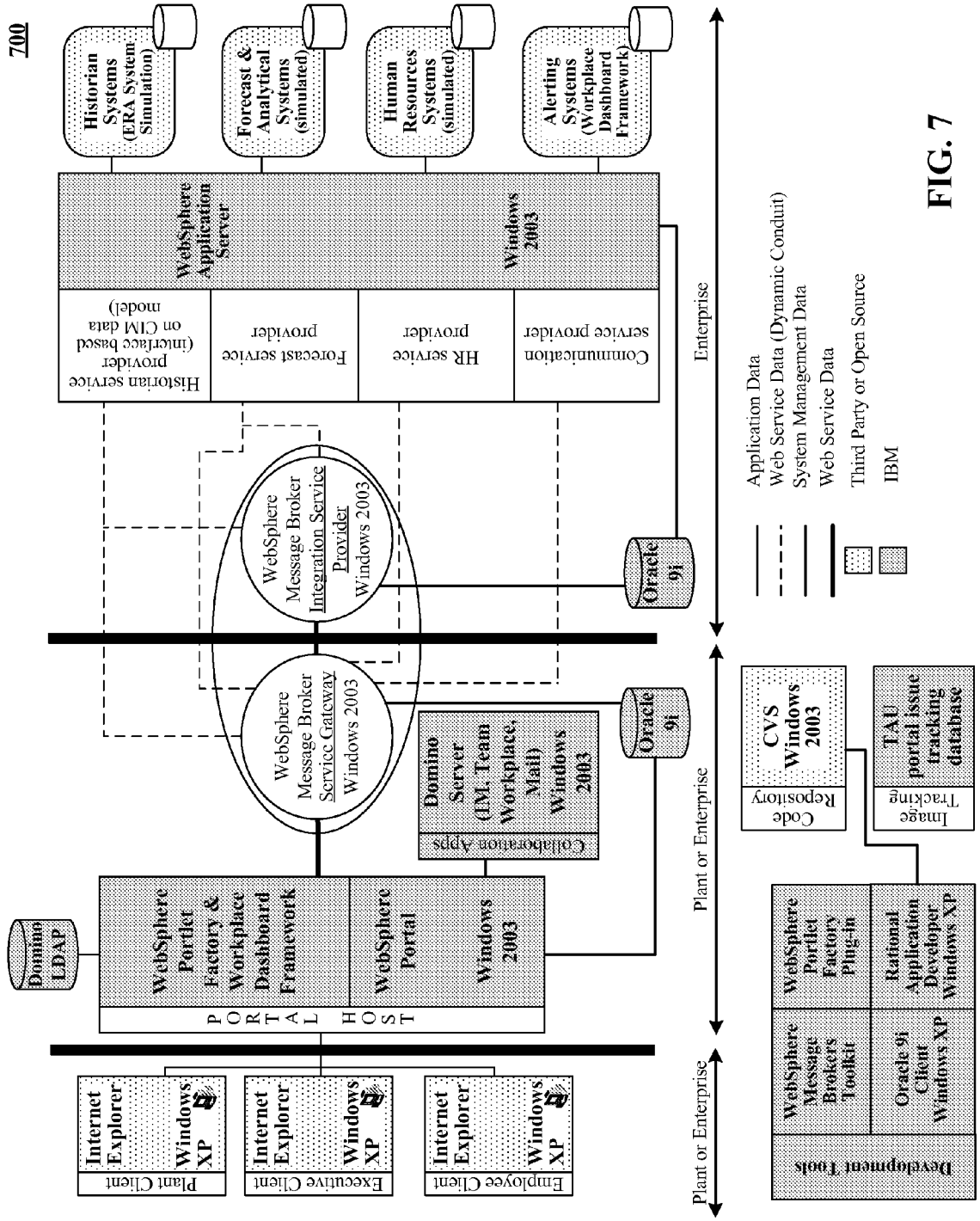
FIG. 7 is a schematic diagram illustrating an operational model customized for a client in accordance with an embodiment of the inventive arrangements disclosed herein.

FIG. 7 is a schematic diagram 700 illustrating an operational model customized for a client in accordance with an embodiment of the inventive arrangements disclosed herein. That is, diagram 700 represents a target model including software components customized for a client's computing environment. The sandbox testing environment will be constructed to correspond to the system shown in diagram 700, which should be identical to an actual client-side deployment environment.

Figure 8B:
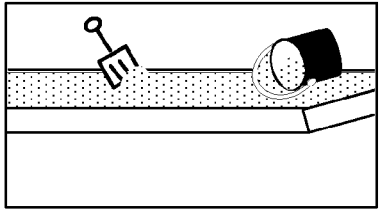

FIG. 8A-C illustrate a series of example agendas 810-832 for skills transfer sessions for the integration and skills transfer stage 380 of approach 300. Training for transferring skills can occur over many days, shown by agendas 810-812 for day one, agenda 820 for day two, and agendas 830-832 for day three.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for deploying a reference model of a SOA framework to a target Information Technology (IT) environment comprising:
performing a set of activities by a computer during a transition enablement stage, within which a gap analysis report is generated based on an analysis performed between a reference software component model for a service oriented architecture (SOA) framework and a target software component model to be executed in a specific IT infrastructure environment, wherein said target software component model is a customized version of the reference software component model, the gap analysis report specifies for each software component of the software reference model a reference platform for the software component, a list of available platforms, a target platform of the specific IT infrastructure environment for implementing the software component, differences between the reference platform and the target platform, and changes to be made to at least one of the target platform and the software component to resolve the differences, the gap analysis report further defines the differences and changes that are agreed upon by a deployment team and a client's IT team;
performing a set of activities by a computer during an environment preparation stage, within which an assessment is conducted of the necessary software component customizations to the reference software component model for the target software component model and within which an assessment of changes needed to the IT software and hardware environment are made;
wherein ending the transition enablement stage and beginning the environment preparation stage occurs upon establishing the gap analysis report;
performing a set of activities by a computer during a sandbox delivery stage, within which a test environment having characteristics of the IT infrastructure environment as it exists after the changes resulting from the assessment is established, within which a deployable version of the target software component model including the software component customizations and reference software components is tested within the test environment, and within which a tested version of the target software component model is deployed to the IT infrastructure environment, which has been changed in accordance with changes resulting from the assessment, and wherein each stage of the method is a distinct phase that must be successfully completed before activities for a subsequent stage are performed.

2. The method of claim 1, wherein during the environment preparation stage, the client's IT team modifies the IT infrastructure environment based upon the assessed changes needed for supporting software components of the target software component model, and wherein during the environment preparation stage, the deployment team creates the software component customizations.

3. The method of claim 1, further comprising:
performing a set of activities during an integration and skills transfer stage, within which a business scenario is tested upon the deployed target software model and within which skills transfer activities are conducted to provide hands on experience to a client's IT team, which will be maintaining the deployed target software model.

4. The method of claim 3, further comprising:
requiring a set of initial prerequisite skills of the client's IT team; and throughout the phases of the method, transferring skills to the client's IT team.

5. The method of claim 3, wherein said transition enablement stage, said environment preparation stage, said sandbox delivery stage, and said integration and skills transfer stage are standardized stages that are part of a repeatable process for deploying a portable SOA framework in a target IT environment.

6. The method of claim 1, wherein the reference software component model is a deployed instance of the service oriented architecture (SOA) framework.

7. The method of claim 1, wherein the reference software component model is a portable service oriented infrastructure that is able to be deployed into the specific target software component model to create the target component model, wherein the deployment of the reference software component model and creation of the specific target software model leverages integration assets from past deployments.

8. The method of claim 1, further comprising:
separating an effort to deploy a service oriented architecture (SOA) solution into a plurality of distinct, sequential stages, wherein each stage has an established checkpoint, which must be successfully completed before subsequent stages are able to be begun, wherein the SOA solution consists of customizing a deployable instance of the service oriented architecture (SOA) framework referred to as the reference software component model to create the target software component model, wherein said sequential stages comprise at least the transition enablement stage, the environment preparation stage, and the sandbox delivery stage.

9. The method of claim 8, further comprising:
conducting the transition enablement stage of the effort;
at a checkpoint for the transition enablement stage determining whether the transition enablement stage has been successfully completed;
when not successfully completed, performing remedial actions until the transition enablement stage is successfully completed;
once the checkpoint results indicates successful completion of the transition enablement stage, conducting the environment preparation stage of the effort;
at a checkpoint for the environment preparation stage determining whether the environment preparation stage has been successfully completed;
when not successfully completed, performing remedial actions until the environment preparation stage is successfully completed;
once the checkpoint results indicates successful completion of the environment preparation stage, conducting the sandbox delivery stage of the effort;
at a checkpoint for the sandbox delivery stage determining whether the sandbox delivery stage has been successfully completed;
when not successfully completed, performing remedial actions until the sandbox delivery stage is successfully completed;
once the checkpoint results indicates successful completion of the sandbox delivery stage, conducting an integration and skills transfer stage of the effort;
at a checkpoint for the sandbox delivery stage determining whether the integration and skills transfer stage has been successfully completed; and
when not successfully completed, performing remedial actions until the integration and skills transfer stage is successfully completed.

10. A method for deploying a portable SOA framework to an Information Technology (IT) environment comprising:
during a transition enablement stage, and performed by a computer:
identifying a reference model comprising a plurality of reference software components that form a Service Oriented Architecture (SOA) framework;
determining an IT infrastructure environment within which a customized SOA solution based upon reference model is to be deployed, wherein the customized SOA solution is referred to as a target model;
specifying a reference platform needed for each of the reference software components;
determining a target platform of the IT infrastructure for supporting each of the reference software components;
assessing differences between the reference platform and the target platform for each of the reference software components;
resolving the assessed differences by performing at least one reconciliation action, said reconciliation action comprising at least one of customizing the reference software component so that it is able to be supported by the target platform and changing the target platform so that it is able to support the reference software component;
during an environment preparation stage, upon completing the transition enablement stage, and performed by a computer:
creating the target model, which includes said reference software components and possible customizations to the reference software components resulting from reconciliation actions;
during a sandbox delivery stage, upon completing the environment preparation state, and performed by a computer:
modifying the IT environment in accordance with changes for the reconciliation actions;
constructing a test environment having the characteristics of the modified IT infrastructure;
testing the created target model within the test environment; and
deploying the target model into the modified IT infrastructure.

11. The method of claim 10, further comprising:
performing a series of hands-on training sessions between a SOA infrastructure deployment team and a client IT team after deployment to ensure the IT team possesses suitable skills and understanding of the deployed target model to maintain and extend the target model.

12. The method of claim 11, further comprising:
requiring a set of initial prerequisite skills of the client IT team; and
throughout the steps of the method, transferring skills from the SOA infrastructure deployment team to the IT team.

13. The method of claim 11, wherein the steps are part of a repeatable, standardized, multi-phased approach for deploying a portable SOA solution to an IT environment.

14. The method of claim 13, wherein the multi-phased approach further comprises an integration and skills transfer stage.

15. The method of claim 10, wherein the reference software components are a portal service oriented architecture (SOA) infrastructure that the method customizes and deploys within a production environment, wherein the customized version of the reference software components is the target model.

* * * * *